US007428330B2

(12) United States Patent
Blake et al.

(10) Patent No.: US 7,428,330 B2
(45) Date of Patent: Sep. 23, 2008

(54) CYCLOPEAN VIRTUAL IMAGING VIA GENERALIZED PROBABILISTIC SMOOTHING

(75) Inventors: Andrew Blake, Stapleford (GB); Philip H. S. Torr, Cambridge (GB); Ingemar J. Cox, London (GB)

(73) Assignee: Microsoft Corporation, Redmond, WA (US)

( * ) Notice: Subject to any disclaimer, the term of this patent is extended or adjusted under 35 U.S.C. 154(b) by 1224 days.

(21) Appl. No.: 10/428,388

(22) Filed: May 2, 2003

(65) Prior Publication Data

US 2004/0218809 A1    Nov. 4, 2004

(51) Int. Cl.
*G06K 9/00* (2006.01)
(52) U.S. Cl. .................................. 382/154
(58) Field of Classification Search ............... 382/154, 382/285, 294
See application file for complete search history.

(56) References Cited

U.S. PATENT DOCUMENTS

| 5,359,362 | A |   | 10/1994 | Lewis et al. |
| 6,046,763 | A | * | 4/2000 | Roy ............................ 348/47 |
| 6,072,496 | A |   | 6/2000 | Guenter et al. |
| 6,304,288 | B1 |  | 10/2001 | Hamagishi |
| 6,606,406 | B1 | * | 8/2003 | Zhang et al. ................. 382/154 |

OTHER PUBLICATIONS

Sang et al. "A new stereo matching algorithm based on Bayesian model" I.E.E.E. Acoustics, Speech, and Signal Processing, 1998; vol. 5, pp. 2769-2772.*
U.S. Appl. No. 09/528,827, filed Mar. 20, 2000, Microsoft Corporation.

Basu, Sumit, ESSA, Irfan, Pentland, Alex; "Motion Regularization for Model-Based Head Tracking." In Proceedings of International Conference on Pattern Recognition, Wien, Austria, 1996 IEEE, pp. 611-616.

Belhumeur, Peter N.; Mumford, David "A Bayesian Treatment of the Stereo Correspondence Problem Using Half-Occluded Regions" IEEE Conference on Computer Vision and Pattern Recognition, 1992, 8pgs.

Black, Michael J., Yacoob, Yaser; "Tracking and Recognizing Rigid and Non-Rigid Facial Motions Using Local Parametric Models of Image Motion"; IEEE Proceedings of International Conference on Computer Vision, Cambridge, MA, 1995, pp. 374-381.

Bobick, Aaron F., Intille, Stephen S.; "Large Occlusion Stereo"; HCV 1999, pp. 1-25.

Chen, Shenchang Eric, Williams, Lance; "View Interpolation for Image Synthesis"; SIGGRAPH, 1993, pp. 1-7.

Choi, Change Seok, Aizawa, Kiyoharu, Harashima, Hiroshi, Takebe, Tsuyoshi; "Analysis and Synthesis of Facial Image Sequences in Model-Based Image Coding" IEEE Transaction on Circuits and Systems for Video Technology v. 4, n 3 Jun. 1994, pp. 257-275.

(Continued)

*Primary Examiner*—Brian Le

(57) ABSTRACT

A cyclopean virtual imaging system provides a view from a virtual camera placed symmetrically or midway between the calibrated cameras of a physical stereo pair. Such a system may be used in video conferencing applications as well as other stereo image contexts. By combining the left and right stereo images captured by the stereo pair, a virtual image is produced such that the subject appears to be looking into a cyclopean virtual camera, rather than to the left or right of a single physical camera. The cyclopean virtual image is generated by a forward-backward algorithm using a probabilistic distribution of possible disparity families.

27 Claims, 8 Drawing Sheets

OTHER PUBLICATIONS

Cox, Ingemar J., Hingorani, Sunita L., Rao, Satish B., Maggs, Bruce M.; "A Maximum Likelihood Stereo Algorithm" Computer vision and Image Understanding, May 1996, pp. 542-567 (1-47).

Darrell, Trevor, Baback, Moghaddam, Pentland, Alex P.; "Active Face Tracking and Pose Estimation in an Interactive Room" IEEE Computer Vision and Pattern Recognition, 1996, pp. 67-72 (1-16).

DeCarlo, Douglas, Metaxes, Dimitris; "Optical Flow Constraints on Deformable Models with Applications to Face Tracking" International Journal of computer Vision, 2000, pp. 99-127 (1-42).

Gemmell, Jim, Toyama, Kentaro, Zitnick, C. Lawrence, Kang, Thomas, Seitz, Steven; "Gaze Awareness for Video-Conferencing: A Software Approach" Oct.-Dec. 2000, pp. 26-35.

Horprasert, Thanarat, Yacoob, Yaser, Davis, Larry S.; "Computing 3-D Head Orientation From a Monocular Image Sequence"; Interantional Conference Automatic Face and Gesture Recognition, 1996, pp. 242-247.

Ishikawa, Hiroshi, Geiger, Davi; "Occlusions, Discontinuities, and Epipolar Lines in Stereo" The Fifth European Conference on Computer Vision (ECCV '98) Jun. 1998, Germany pp. 1-14.

Kolmogorov, Vladimir, Zabih, Ramin; "Multi-Camera Scene Reconstruction via Graph Cuts", Proc. Europ. Conf. Computer Vision, Copenhagen, Denmark, May 2002, pp. 1-16.

Li, Haibo, Roivainen, Pertti, Forchheimer, Robert; "3-D Motion Estimation in Model-Based Facial Image Coding" IEEE Transactions on Pattern Analysis and Machine Intelligence, v. 15, n 6, Jun. 1993, pp. 545-555.

Liu, Zicheng, Zhang, Zhengyou, Jacobs, Chuck, Cohen, Michael; "Rapid Modeling of Animated Faces from Video" Proceedings of the Fourth IEEE International Conference on Automatic Face and Gesture Recognition Feb. 2000, pp. 58-67.

Loop, Charles, Zhang, Zhengyou; "Computing Rectifying Homographies for Stereo Vision" Technical Report MSR-TR-99-21, 14 pgs.

Lu, Le, Zhang, Zhengyou, Shum, Heung-Yeung, Liu, Zicheng, Chen, Hong; "Model and Exemplar-Based Robust Head Pose Tracking Under Occlusion and Varying Expression" IEEE Computer Soc. Conf. on Computer Vision & Pattern Recog., Dec. 2001, Hawaii, USA, pp. 1-8.

Newman, Rhys, Matsumoto, Yoshio, Rougeaux, Sebastien, Zelinsky, Alexander; "Real-Time Stereo Tracking for Head Pose and Gaze Estimation" IEEE 2000 pp. 122-128.

Ohta, Yuichi, Kanade, Takeo; "Stereo by Intra-and Inter-Scanline Search Using Dynamic Programming" IEEE 1985, 16 pgs.

Roy, Sebastien, Cox, Ingemar J.; "A Maximum-Flow Formulation of the N-Camera Stereo Correspondence Problem" IEEE Proc. of Int. Conference on Computer Vision, Bombai, Jan. 1998, pp. 492-499.

Scharstein, Daniel, Szeliski, Richard, Zabih, Ramin; "A Taxonomy and Evaluation of Dense Two-Frame Stereo Correspondence Algorithms"; International Journal of Computer Vision, 2002, 10pgs.

Scharstein, Daniel, "Stereo Vision for View Synthesis" IEEE Computer Society Conference on Computer Vision and Pattern Recognition, San Francisco, CA, Jun. 1996 pp. 852-858.

Shi, Jianbo, Tomasi, Carlo; "Good Features to Track"; IEEE Conference on Computer Vision and Pattern Recognition, Seattle WA, Jun. 1994, 7pgs.

Sun, Jian, Shum, Heung-Yeung, Zheng, Nan-Ning; "Stereo Matching Using Belief Propagation" ECCV 2002, pp. 510-524.

Szeliski, Richard; "Prediction Error as a Quality Metric for Motion and Stereo" Vision Technology Group Microsoft Research, Proceeding of the International Conference on Computer Vision, vol. 2, Corfu, Greece, 1999, 8pgs.

Vetter, Thomas "Synthesis of Novel Views From a Single Face Image" Max-Planck-Institut, Germany, Technical Report No. 26, Feb. 1996, pp. 1-13.

Yang, Ruigang, Zhang, Zhengyou; "Eye Gaze Correction with Stereovision for Video-Teleconferencing" Proceedings from the European Conference of Computer Vision, vol. 2, Copenhagen, Denmark May 2002, pp. 479-494.

Zhang, Zhengyou, Liu, Zicheng, Adler, Dennis, Cohen, Michael F., Hanson, Erik, Shan, Ying; "Robust and Rapid Generation of Animated Faces from Video Images: A Model-Based Modeling Approach" Technical Report MSR-TR-2001-101 pp. 1-30.

* cited by examiner

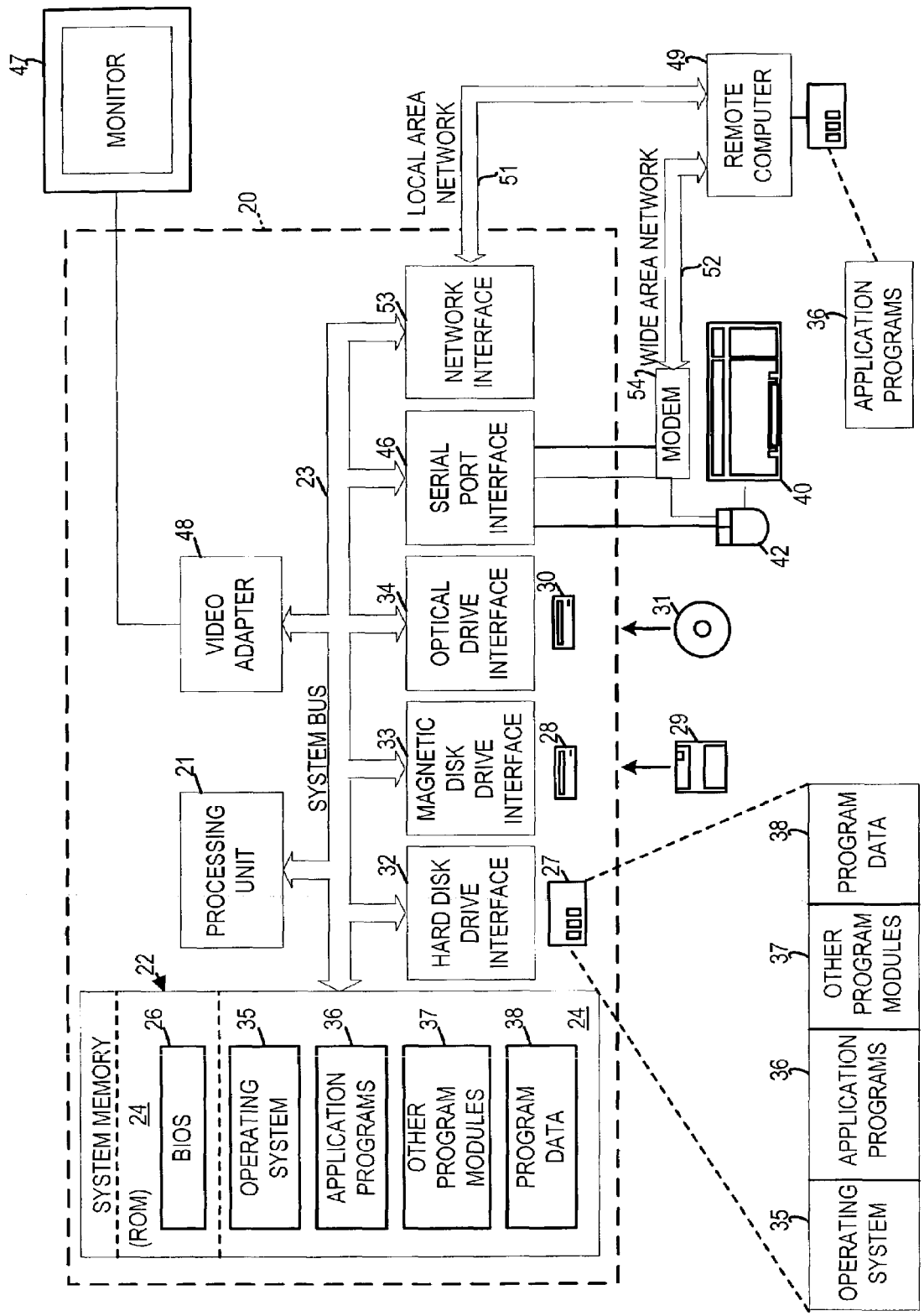

CYCLOPEAN VIRTUAL IMAGING VIA GENERALIZED PROBABILISTIC SMOOTHING

TECHNICAL FIELD

The invention relates generally to image processing, and more particularly to improving video teleconferencing.

BACKGROUND

Digital video cameras are useful in both consumer and professional contexts. Generally, digital video cameras capture sequences of digital images, which may then be transferred to a computer system for display or processing or to a storage device for storage.

One specific practice employs a digital video camera in a video conferencing application. In a typical video conference, an image sequence depicting a conference participant is transmitted to one or more other participants. Concurrently, image sequences depicting the other participants are transmitted to the first participant's display device. In this manner, each participant can view an interactive video of the other participants during the conference.

In a typical video teleconferencing environment, a single video camera is focused on a conference participant, who views the other participants in a video window in his or her display device. The video camera is commonly mounted on or near the display of a computer or television system in an attempt to minimize the angle between the camera and the video window. Minimizing this angle can enhance the illusion that the participant is looking into the camera instead of at the video window in the display device. However, the angle is never really eliminated and in fact can remain significant, particularly when the camera is close to the participant. As a result, for example, the other participants receive a display of the top or side of the first participant's head, instead of a straight-on view of the first participant's face.

This situation provides a diminished user experience and limits the effectiveness of such video conferencing. It is difficult to develop trust between participants in the conference because of the difficulty in establishing eye contact (i.e., the displayed participant is looking at his or her display instead of the camera). Likewise, facial expressions may be distorted or obscured by the angular discrepancy, thereby losing some important communication cues.

Conceptually, these problems may be resolved by a physical camera positioned in the center of the display window, such that the participant's focus and the camera's focus are aligned—envision a video display with a hole drilled in the middle of it in which to mount the camera. However, such configurations are impractical for obvious reasons.

SUMMARY

Implementations described and claimed herein solve the discussed problems by using multiple cameras to synthesize a cyclopean view of the camera's subject. An exemplary cyclopean view provides a view from a virtual camera placed symmetrically or midway between calibrated cameras of a physical stereo camera pair. Generally, by combining images from two or more digital cameras, a cyclopean virtual image may be synthesized using Bayesian ineLrenice to perform robust estimation of cyclopean intensities. Such a combination results in an effective form of "gaze correction". In a properly configured environment, the virtual cyclopean camera may appear to be centered in the video window showing the other participants in the video teleconference. Furthermore, other imaging applications, such as videography for movies and television or conversion of stereoscopic images into printable monoscopic images, can benefit from synthesizing a cyclopean view.

In some implementations, articles of manufacture are provided as computer program products. One implementation of a computer program product provides a computer program storage medium readable by a computer system and encoding a computer program that determines a cyclopean image associated with a left image and a right image related by a stereo disparity. Another implementation of a computer program product may be provided in a computer data signal embodied in a carrier wave by a computing system and encoding the computer program that determines a cyclopean image associated with a left image and a right image related by a stereo disparity.

The computer program product encodes a computer program for executing on a computer system a computer process for determining a cyclopean image associated with a left image and a right image related by a stereo disparity. A joint posterior density of the stereo disparity with a disparity gradient is computed based on a forward probability distribution of the stereo disparity and a backward probability distribution of the stereo disparity. The cyclopean image is estimated based on the joint posterior density of the stereo disparity with the disparity gradient.

In another implementation, a method of determining a cyclopean image associated with a left image and a right image related by a stereo disparity is provided. A joint posterior density of the stereo disparity with a disparity gradient is computed based on a forward probability distribution of the stereo disparity and a backward probability distribution of the stereo disparity. The cyclopean image is estimated based on the joint posterior density of the stereo disparity with the disparity gradient.

In yet another implementation, a system for determining a cyclopean image associated with a left image and a right image related by a stereo disparity is provided. A forward-backward module computes a joint posterior density of the stereo disparity with a disparity gradient based on a forward probability distribution of the stereo disparity and a backward probability distribution of the stereo disparity. A cyclopean image generator estimates the cyclopean image based on the joint posterior density of the stereo disparity with the disparity gradient.

BRIEF DESCRIPTION OF THE DRAWINGS

FIG. 8 illustrates an exemplary system useful for implementing an embodiment of the present invention.

DETAILED DESCRIPTION OF THE INVENTION

A cyclopean virtual image provides a view from a virtual camera placed symmetrically or midway between the calibrated cameras of a physical stereo pair. By combining the left and right stereo images captured by the stereo pair, a virtual image is produced such that the subject appears to be looking into a cyclopean virtual camera, rather than to the left or right of a single physical camera. The cyclopean virtual image is generated by a forward-backward algorithm using a probabilistic distribution of possible disparity families.

Figure 1:
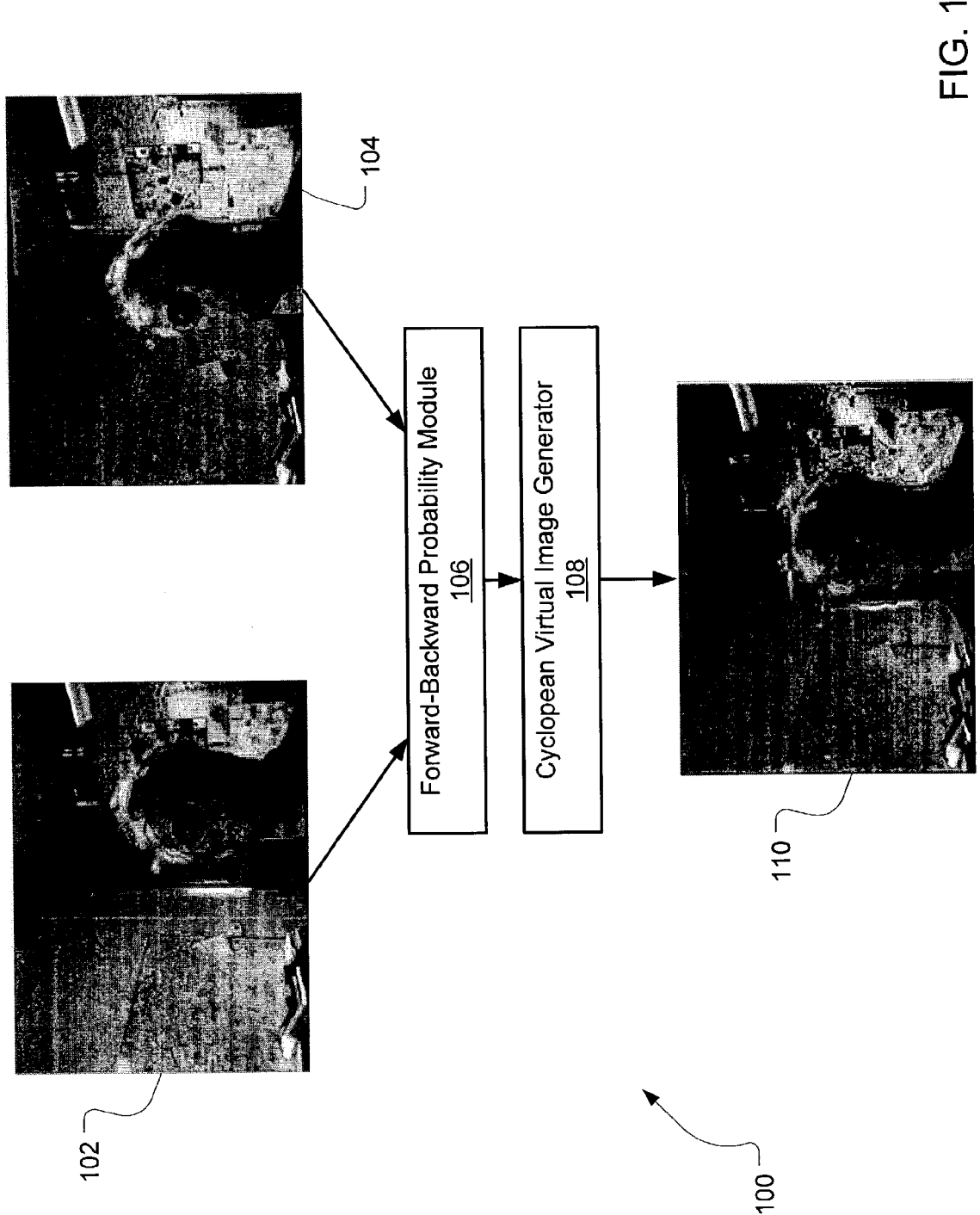
FIG. 1 illustrates an exemplary system for generating a cyclopean virtual image.

FIG. 1 illustrates an exemplary system 100 for generating a cyclopean virtual image. In the system 100, a left image 102 is captured by a camera mounted on the right side of the video display, as seen by the user. Likewise, a right image 104 is captured by a camera mounted on the left side of the video display, as seen by the user. As such, in both images, the user can be seen looking into the video display, as opposed to looking to the right or left of one of the cameras. The left and right images 102 and 104 are input to a forward-backward probability module 106, which computes a forward probability distribution of the stereo disparity and a backward probability distribution of the stereo disparity between the left and right images.

In one implementation, the forward-backward probability module 106 includes a forward probability computation module (not shown) for computing the forward probability distribution of the stereo disparity between the left and right images, and a backward probability computation module (not shown) for computing the forward probability distribution of the stereo disparity between the left and right images. An exemplary forward probability computing module includes instructions and/or circuitry for computing the forward probability (such as by implementing the algorithm of Equation (11) below). Likewise, an exemplary backward probability computing module includes instructions and/or circuitry for computing the backward probability (such as by implementing the algorithm of Equation (12) below).

The output of the forward-backward probability module 106 is input to a cyclopean virtual image generator 108, which synthesizes a cyclopean virtual image 110 based on a joint probability density of stereo disparity with the disparity gradient and an expectation of the cyclopean image intensities. The cyclopean virtual image 110 shows the user as appearing to look directly into the camera.

Figure 2:
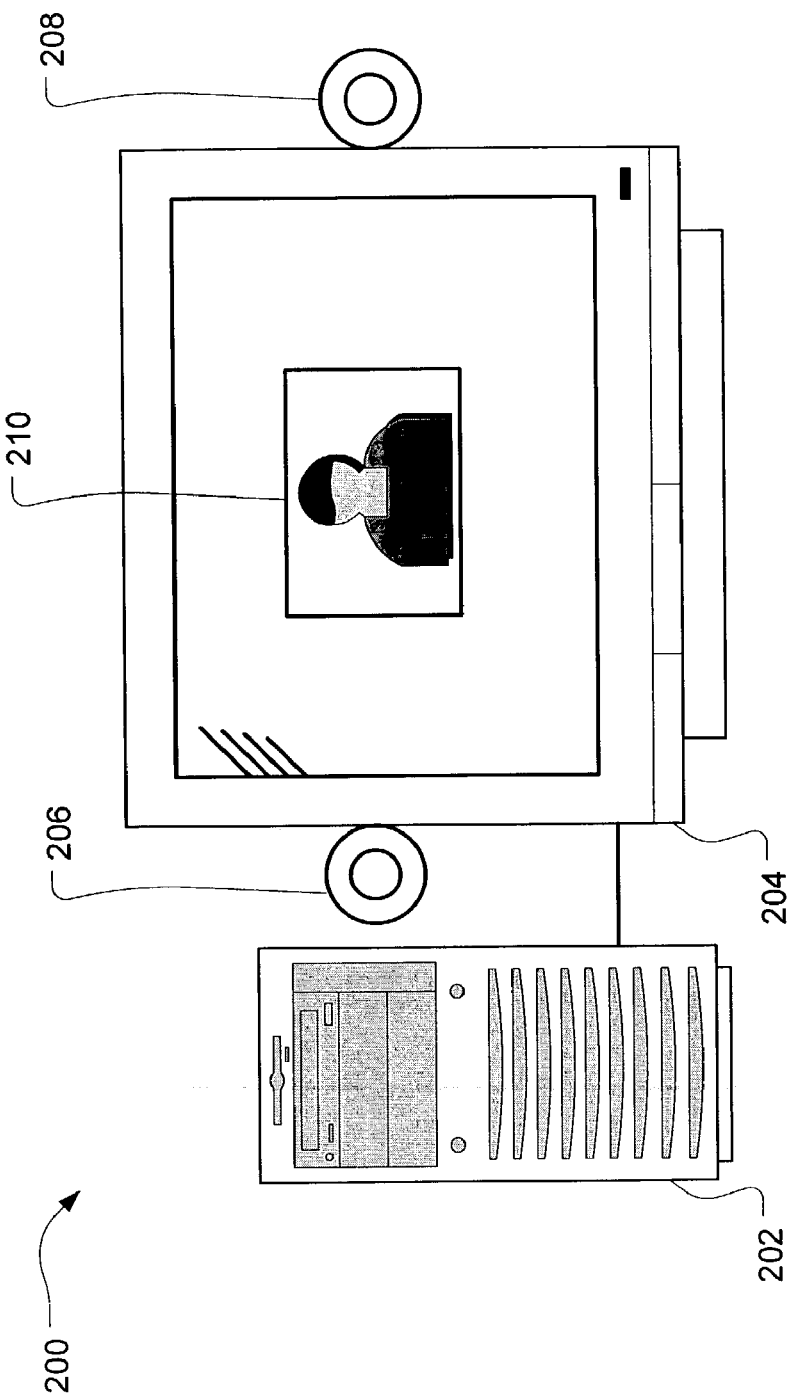
FIG. 2 illustrates an exemplary video conferencing system configuration for generating a cyclopean virtual image.

FIG. 2 illustrates an exemplary video conferencing system configuration 200 for generating a cyclopean virtual image. A computer system 202 is coupled to a video display 204 having two cameras 206 and 208 mounted on either side of the video display 204. A video window 210 displays a remote participant on the other end of the video conference session.

In a configuration having only a single camera, the user typically focus his or her eyes on the video window 210, while the single camera captures images of the user from one side of the other. As such, the captured images sent to the remote participant are primarily a side view of the user's head, not a straight-on view of the user's face. The illustrated configuration, however, allows generation of a cyclopean virtual image from the captured left and right images of the user.

The cyclopean virtual image generation synthesizes the cyclopean virtual image by treating the disparity field between corresponding left and right images as a first-class random variable. As such, the cyclopean virtual image is estimated over an entire family of possible disparity maps, rather than over a predetermined, fixed disparity map.

It should be understood that more than two cameras may also be used to generate a cyclopean virtual image. Likewise, the cameras may be in alternative orientations, such as at the top and bottom of the video display. For example, one configuration may include four cameras, each placed at a corner of the video display.

The cyclopean virtual image $\hat{I}$ is synthesized from intensity functions $L=\{L_m, m=0, \ldots, N\}$ and $R=\{R_n, n=0, \ldots, N\}$, which represent epipolar lines (or scan lines) of observed (i.e., captured) left and right images. A matched pair $(L_m, R_n)$ has "stereo disparity" of $d=n-m$, which may be considered a measure of is "parallax". The cyclopean virtual image $\hat{I}$ may be inferred using a posterior $p(d|z)$ as the distribution of the disparity field, wherein $z=(L,R)$ represents an observation of left and right epipolar lines and $p(z|I,d)$ represents an observer model. In one implementation, each image contains color pixels in three color channels, such that $L_m, R_n \in \Re^3$. In a more general setting, however, there may be other features, such that $L_m, R_n \in \Re^f$, where f is an integer. For example, groups of pixels may be filtered to obtain improved invariance to illumination variations or non-uniform camera sensitivities.

Left and right pixels are assumed to have been generated by adding noise to the value of the corresponding cyclopean pixels, such that $$L_m = I_k + \mu_m \text{ and } R_n = I_k + \upsilon_n \tag{1}$$

where $\mu_m$ and $\upsilon_n$ represent random noise variables, assumed identical, independently distributed and Gaussian across all m,n (and isotropic, if the pixel values represents color intensities).

A cyclopean epipolar line (i.e., the corresponding line in the virtual cyclopean image) is represented by $I=\{I_k, k=0, \ldots, 2N\}$. The cyclopean virtual image $\hat{I}$ is constructed from a set of cyclopean epipolar lines stacked line-by-line to form the resulting image.

Figure 3:
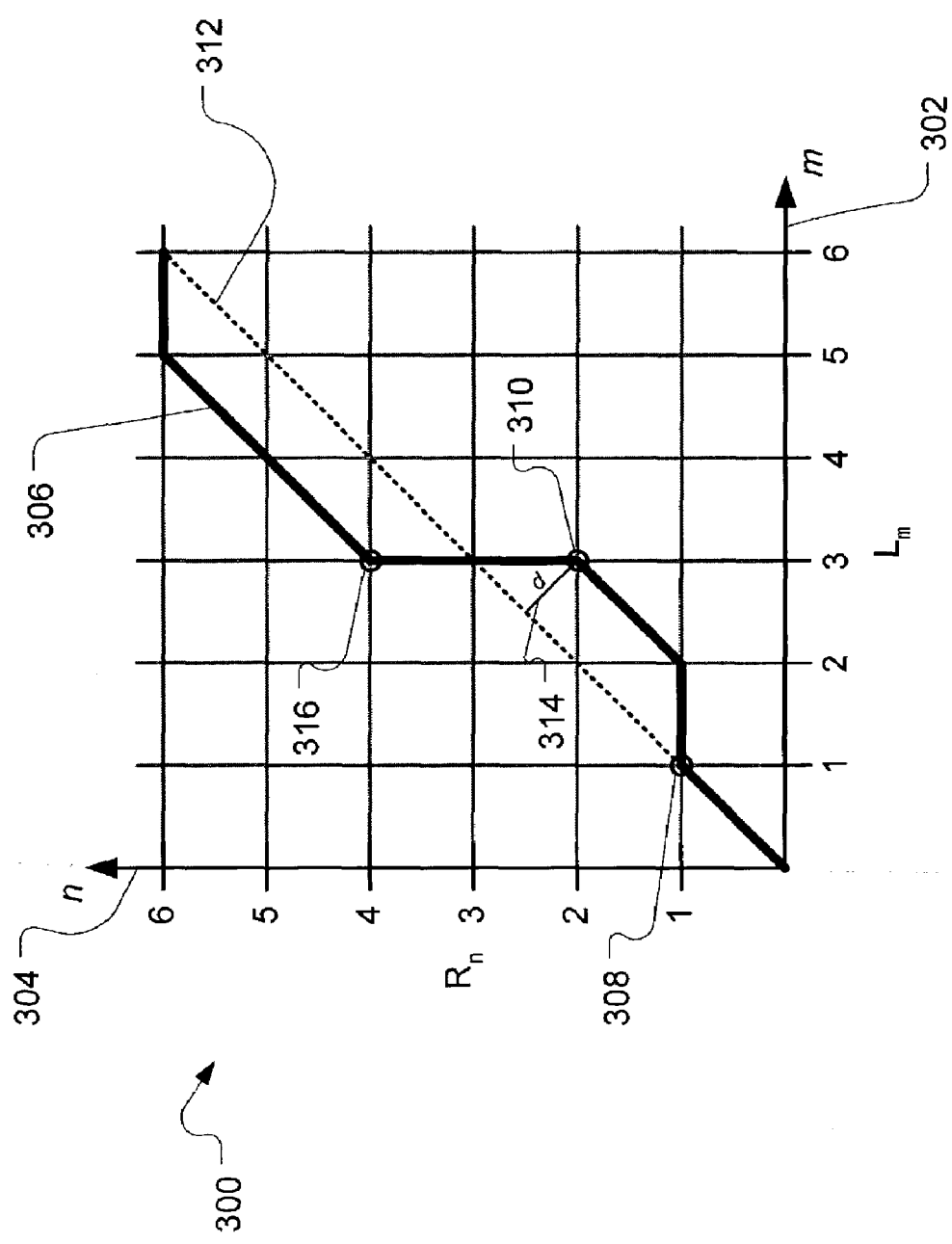
FIG. 3 illustrates stereo disparity as a function of left and right epipolar lines.

FIG. 3 illustrates stereo disparity as a function of left and right epipolar lines L and R, which are defined in terms of pixel coordinates m and n, respectively. The stereo disparity between the left and right stereo images is defined as a vector $d=\{d_k, k=0, \ldots, 2N\}$ having components expressed in cyclopean coordinates k.

A diagram 300 shows an axis 302, representing a sequence of positions along a left epipolar line L, and another axis 304 representing a sequence of positions along a right epipolar line R. The correspondence line 306 indicates matches between pixels in given sequential positions in L with pixels in given sequential positions in R. For example, pixel 1 of L matches pixel 1 of R, as shown by point 308. In contrast, pixel 3 of L matches pixel 2 of R, as shown by point 310. The disparity associated with a point on the correspondence line 304 is defined as the orthogonal distance of the point from a zero disparity axis 312. For example, the disparity of the point 308 is zero, whereas the disparity d of the point 310 is shown by line 314. (As suggested by the disparity axis of FIG. 4, the disparity of point 310 is "−1".)

Accordingly, the correspondence line 306 represents a two-dimensional profile of a scan line of the virtual image, where pixels with a higher disparity (e.g., point 316, which has a positive disparity relative to the zero parallax line 312) are closer to the virtual cyclopean camera and pixels with a lower disparity (e.g., point 310, which has a negative disparity relative to the zero parallax line 312) are farther away from the virtual cyclopean camera. Stacking a set of these two-dimensional profiles, which correspond to individual cyclopean epipolar lines, can yield a three-dimensional profile surface of the image subject.

Using a first-class random variable to represent the disparity field d, such that d has the estimated posterior distribution p(z|I,d), the cyclopean virtual image can be estimated robustly as the cyclopean image $\hat{I}$ that minimizes the expectation of the loss $\mathcal{L}$:

$$\hat{I} = \arg\min_{I'} \varepsilon_{I|z}[\mathcal{L}(I', I)]]. \quad (2)$$

Figure 4:
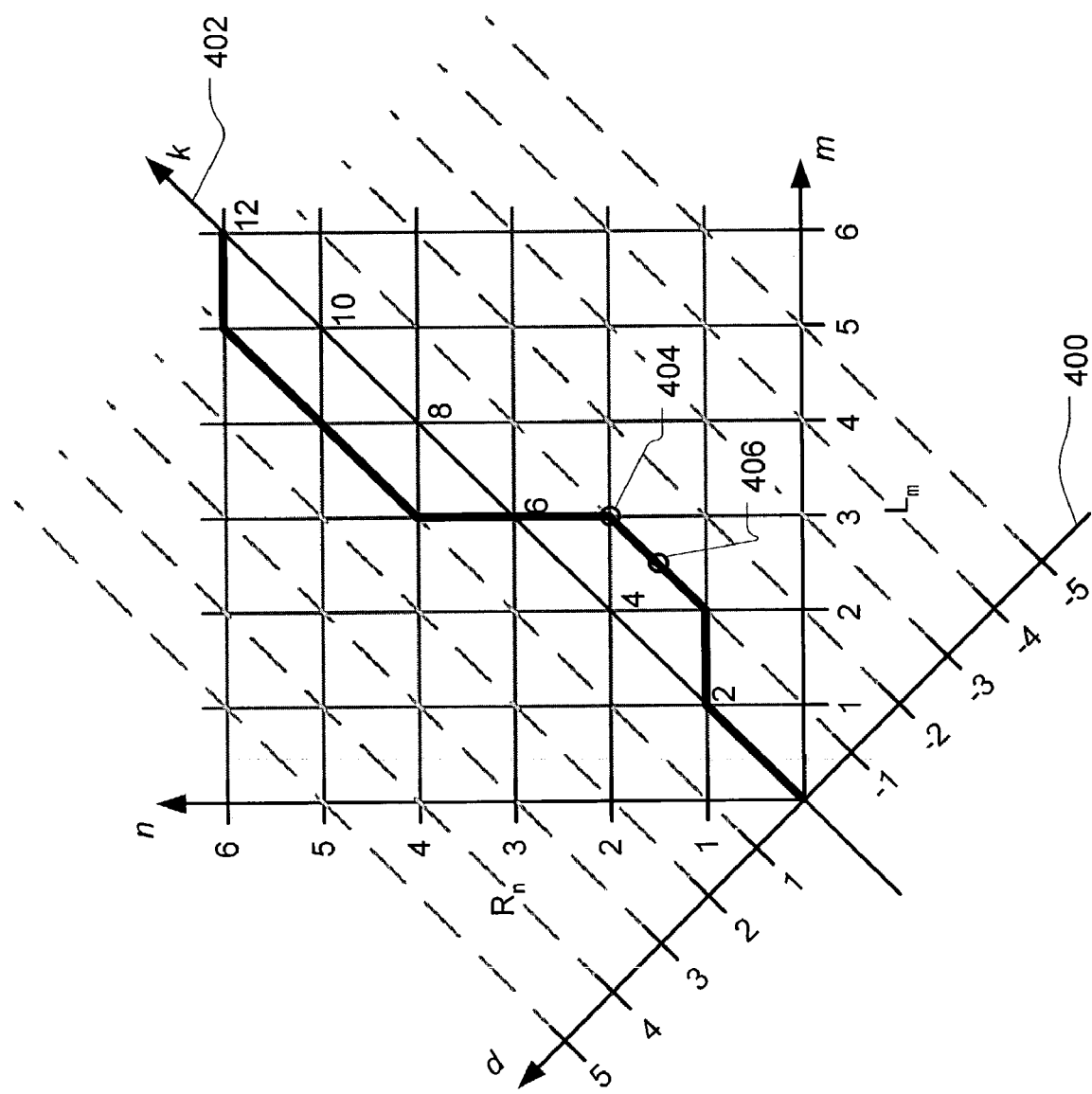
FIG. 4 illustrates disparity and cyclopean axes overlaid on left and right image axes.

FIG. 4 illustrates disparity and cyclopean axes overlaid on the L and R axes. Based on the disparity axis 400, a disparity vector d in cyclopean coordinates k along the cyclopean axis 402 can be mapped into the pixel coordinates m and n.

The cyclopean coordinate k corresponding to pixel coordinates m and n is computed as k=m+n. Stereo disparity induces a warp vector h={$h_k$, k=0, ..., 2N} of image warps from cyclopean coordinates into the coordinates of the left and right images. The warp function h probabilistically associates image intensities at locations k, m(k), and n(k) in the cyclopean virtual image, the left image, and the right image, respectively. Accordingly, a match $h_k$ is defined by $$h_k = (m(k), n(k)) = \left(\frac{1}{2}(k - d_k), \frac{1}{2}(k + d_k)\right) \quad (3)$$

Conversely, stereo disparity may be expressed as the pixel coordinate difference $d_k$=n−m. A pixel 404, corresponding to (m,n)=(3,2) in pixel coordinates, maps to cyclopean coordinate k=5, such that $d_5$=−1. Likewise, an intermediate pixel 406, corresponding to (m,n)=(2.5,1.5) in pixel coordinates, maps to cyclopean coordinate k=4, such that $d_4$=−1.

When k+$d_k$ is even, (m(k),n(k)) are integers, so that $h_k$ warps directly onto the left and right coordinate grids. In this case, the warp is referred to as being "even" (e.g., pixel 404). "Odd" warps, however, do not result in direct mapping to between the cyclopean coordinates and integer coordinates in the right and left coordinate grids (e.g., pixel 406). Therefore, odd warps are deemed to be transitory states.

In one implementation, the space of matches between left and right images is constrained and conditioned by a probability distribution P($d_k$|$d_{k-1}$) which specifies a random process for disparities at successive locations on the cyclopean epipolar line. It is assumed that $d_k$ depends directly on the immediate preceding disparity $d_{k-1}$.

The joint likelihood of observations is denoted by p(z|I,d) and can be decomposed into a product over pixels and pixel pairs using the independence of $\mu_m$ and $\nu_n$. The history of observations "preceding" the match $h_k$ is denoted as:

$$z_{h_k} \equiv (L_1, \ldots, L_{m(k)}, R_1, \ldots, R_{n(k)}) \quad (4)$$

and the complementary set of "future" observations is denoted as:

$$z^{h_k} \equiv (L_{m(k)+1}, \ldots, L_M, R_{n(k)+1}, \ldots, R_N) \quad (5)$$

Figure 5:
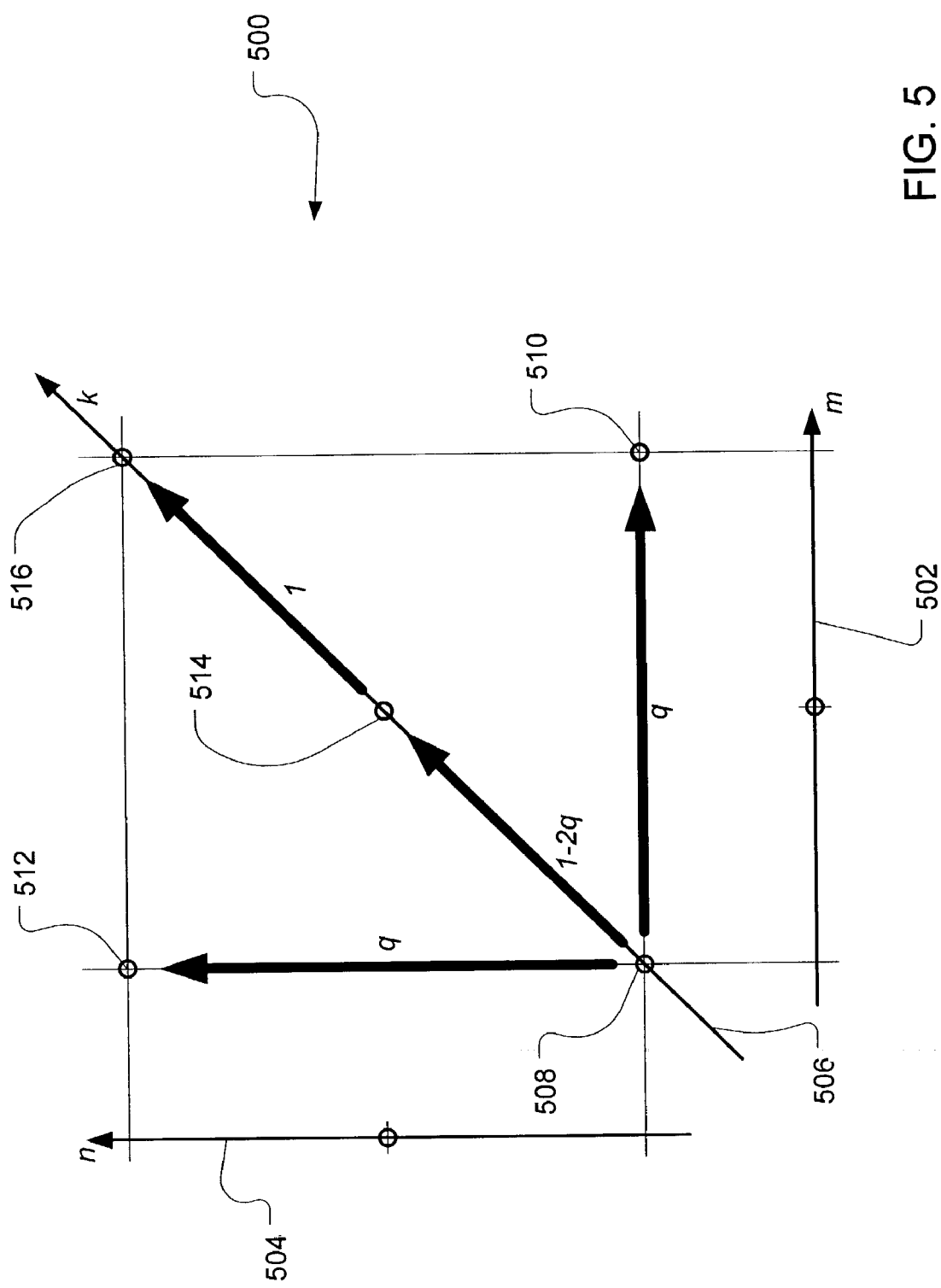
FIG. 5 illustrates a disparity process model.

FIG. 5 illustrates a disparity process model. The disparity process model specifies the distribution of disparity gradients $\delta_k$=$d_k$−$d_{k-1}$. In one implementation, an ordering constraint |$\delta_k$|≦1 and an occlusion penalty (when |$\delta_k$|=1) are applied to achieve a reasonable model, although alternative restrictions are also contemplated. These selected restrictions yield a disparity process distribution:

$$P_d(d_k \mid d_{k-1}) = \begin{cases} 1 & \text{if } h_{k-1} \text{ is odd and} \\ & \delta_k = 0 \text{ (i.e., } d_k = d_{k-1}) \\ q & \text{if } h_{k-1} \text{ is even and} \\ & |\delta_k| = 1 \text{ (i.e., } d_k = d_{k-1} \pm 1) \\ 1-2q & \text{if } h_{k-1} \text{ is even and} \\ & \delta_k = 0 \text{ (i.e., } d_k = d_{k-1}) \\ 0 & \text{otherwise} \end{cases} \quad (6)$$

with some appropriate occlusion probability, satisfying q<⅓ (e.g., q=1/10). Other values of q, however, are also contemplated.

As such, in the grid 500, which is illustrated in relation to pixel coordinate axes 502 and 504 and the cyclopean axis 506, a disparity process between pixels 508 and 510 shows an even warp $h_{k-1}$ for pixel 508 and a disparity gradient of −1 (i.e., $\delta_k$−1). Likewise, the disparity process between pixels 508 and 512 shows an even warp $h_{k-1}$ for pixel 508 and a disparity gradient of +1 (i.e., $\delta_k$=1). In both of these cases, the disparity process for these disparity gradients yields occlusion probabilities of q as the disparity process values.

In contrast, the disparity process between pixels 508 and 514 shows an even warp $h_{k-1}$ for pixel 508 and a disparity gradient of zero (i.e., $\delta_k$=0). As such, the disparity process for this disparity gradient yields a disparity process value of 1−2q. Furthermore, the disparity process between pixels 514 and 516 shows an odd warp $h_{k-1}$ for pixel 514 and a disparity gradient of zero (i.e., $\delta_k$=0). As such, the disparity process for this disparity gradient yields a disparity process value of 1−2q.

The marginal prior distribution for cyclopean virtual image values is represented by $p_0$(I|k) and useful special cases include the stationary case $p_0$(I|k)=$p_0$(I) and the uniform case $p_0$(I)=1/V, where V is the volume of the color space. Alternatively, prior $p_0$ can be modeled as a Gaussian or mixture of Gaussians learned from patches in appropriate neighborhoods of the left and right images. The pixels in the cyclopean image are taken to have mutually independent prior distributions.

The observation density p(z|d) is defined as a marginalization of the full conditional density with respect to intensity:

$$p(z|d) = \int_I p(z|I,d) p_0(I) \quad (7)$$

and decomposed using Bayes' Rule as a product:

$$p(z \mid d) = \prod_k f(z; d_k, d_{k-1}) \quad (8)$$

where the observation function $f$ is defined as $$f(z; d_k, d_{k-1}) = \begin{cases} p([z_{h_k} \setminus z_{h_{k-1}}] \mid d_k, d_{k-1}) & \text{if } h_k \text{ is even} \\ 1 & \text{otherwise} \end{cases} \quad (9)$$

(where \ denotes a set difference operation). In the case of odd warps, $\lfloor z_{k_k} \setminus z_{h_{k-1}} \rfloor$ equals zero. Hence, the observation function $f$ is defined to be unity.

The observation function $f$ may be approximated in the form:

$$f(z; d_k, d_{k-1}) = \begin{cases} \left(\frac{\lambda}{\pi}\right)^{s/2} \exp -\lambda \|L_{m(k)} - R_{n(k)}\|^2 & h_k \text{ even}, \delta_k = 0 \\ p_0(L_{m(k)}) & h_k \text{ even}, \delta_k = -1 \\ p_0(R_{n(k)}) & h_k \text{ even}, \delta_k = 1 \\ 1 & h_k \text{ odd} \end{cases} \quad (10)$$

where s=1 for monochrome observations and s=3 for color observations, and $\lambda$ is a constant such that $1/\lambda$ represents the mean variability of the norm-difference under the conditions of matching pixels $L_m$ and $R_n$.

Figure 6:
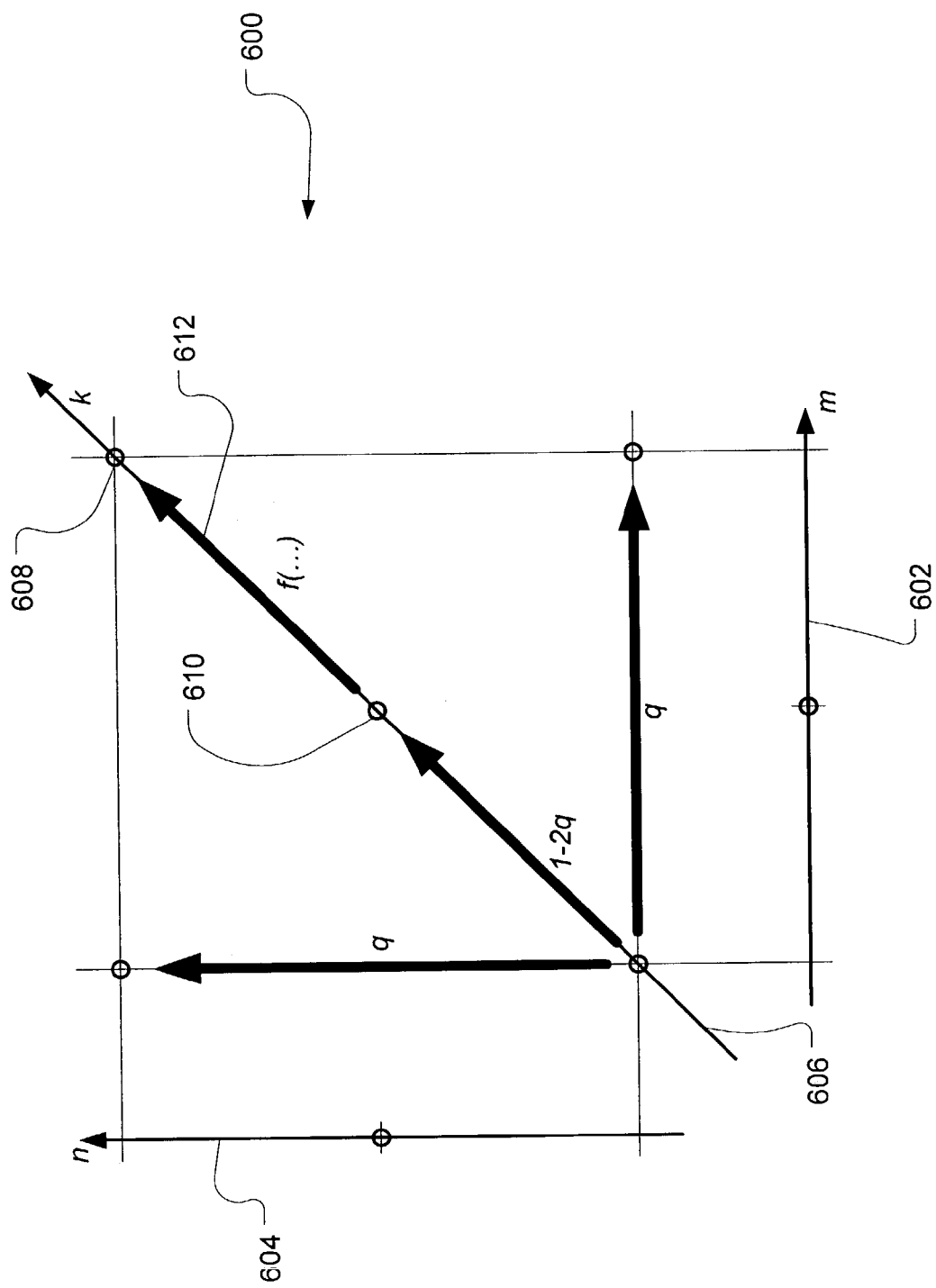
FIG. 6 diagrammatically illustrates an exemplary forward algorithm.

FIG. 6 diagrammatically illustrates an exemplary forward algorithm. In one implementation, a variation of a forward-backward algorithm is employed to determine a joint posterior density $p(d_k, \delta_k|z)$. In a stereo problem, such as is presented here, a forward-backward algorithm is generalized to an observation history $z_{h_k}$, which depends on both the cyclopean coordinate k and the disparity value $d_k$ of the inferred intensity z at coordinate k.

Forward probabilities are, therefore, defined by $a_k(d_k)=P(d_k|z_{h_k})$. Each value of $\alpha_k(d_k)$ is generated iteratively as:

$$\alpha_k(d_k) \propto \sum_{d_{k-1}} \alpha_{k-1}(d_{k-1}) p(d_k | d_{k-1}) f(z; d_k, d_{k-1}). \quad (11)$$

This is shown diagrammatically in a grid 600, which is illustrated in relation to pixel coordinate axes 602 and 604 and the cyclopean axis 606. Considering the observation function $f$ defined in Equation (10), evidence from the observations characterizes the process model for a current cyclopean coordinate k (i.e., pixel 608) relative to a previous cyclopean coordinate k−1 (i.e., pixel 610)—see relation arrow 612.

Backward probabilities are defined by $\beta_k(d_k)=p(z^h|d_k)$. Each value of $\beta_k(d_k)$ is propagated as:

$$\beta_k(d_k) \propto \sum_{d_{k-1}} \beta_{k+1}(d_{k+1}) p(d_{k+1} | d_k) f(z; d_{k+1}, d_k) \quad (12)$$

The forward and backward probabilities are combined to compute the posterior marginal distribution of disparity:

$$\gamma_k(d_k) \equiv p(d_k | z) = \frac{\tilde{\gamma}_k(d_k)}{\sum_{d_k} \tilde{\gamma}_k(d_k)} \quad (13)$$

where $$\gamma_k(d_k) = \alpha_k(d_k)\beta_k(d_k). \quad (14)$$

To allow for occlusion, the posterior forward and backward probabilities also yield $P(d_k, d_{k-1}|z)$, the joint density of the disparity $d_k$ with the disparity gradient $\delta_k$:

$$\xi_k(d_k, \delta_k) \equiv p(d_k, \delta_k | z) = \frac{\tilde{\xi}_k(d_k, \delta_k)}{\sum_{d_k, \delta_k} \tilde{\xi}_k(d_k, \delta_k)} \quad (15)$$

where $$\tilde{\xi}_k(d_k, \delta_k) = \alpha_{k-1}(d_k - \delta_k) P(d(d_k | d_k - \delta_k) \beta_k(d_k) f(z; d_k, d_{k-1}). \quad (16)$$

It is possible to estimate the cyclopean image intensities using the joint posterior density $p(d_k, \delta_k|z)$. At cyclopean pixel k, the intensity $I_k$ is estimated as an expectation, first over the observation noise variables, then over the posterior distribution for disparity. The expectation of noise variables is denoted as $I_k(d_k, \delta_k)$ Given a uniform intensity prior $p_0(I)$, the intensity expectation is:

$$\tilde{I}(d_k, \delta_k) \equiv \varepsilon[I_k | h_k] = \begin{cases} \frac{1}{2}(L_{m(k)} + R_{n(k)}) & \text{if } \delta_k = 0 \\ L_{m(k)} & \text{if } \delta_k = -1 \\ R_{n(k)} & \text{if } \delta_k = +1 \end{cases} \quad (17)$$

wherein the three conditions cover the cases of: no occlusion, right occlusion, and left occlusion.

Variations in the Equation (17) exist for the case of Gaussian priors. The algorithm is defined strictly only when the warp is even (so m,n are integers). This definition provides two options:

(1) Cyclopean intensities are estimated from the even warps only; or
(2) Left/right intensities are interpolated for fractional indices of m,n. For example, $$L_{m+\frac{1}{2}} = \frac{L_m + L_{m+1}}{2} \quad (18)$$

Given the intensity expectation and the joint density of the disparity over the disparity gradient, estimation of the cyclopean intensity is obtained by optimizing the expected loss, such as shown in Equation 19 below. There are various approaches for representing loss, including without limitation a quadratic loss approach for which the estimated intensity is the posterior mean. Using a quadratic loss approach, the estimated cyclopean intensity at cyclopean coordinate k is:

$$\hat{I}_k \equiv \varepsilon_{p(d)}[\tilde{I}_k(d_k, \delta_k)] = \sum_{d_k, \delta_k} \tilde{I}_k(d_k, \delta_k) \xi_k(d_k, \delta_k) \quad (19)$$

Other loss functions are contemplated, including without limitation a "0-1" loss function. The sum defined in Equation 19 includes odd warps. Therefore, left/right intensities may be interpolated where needed.

Figure 7:
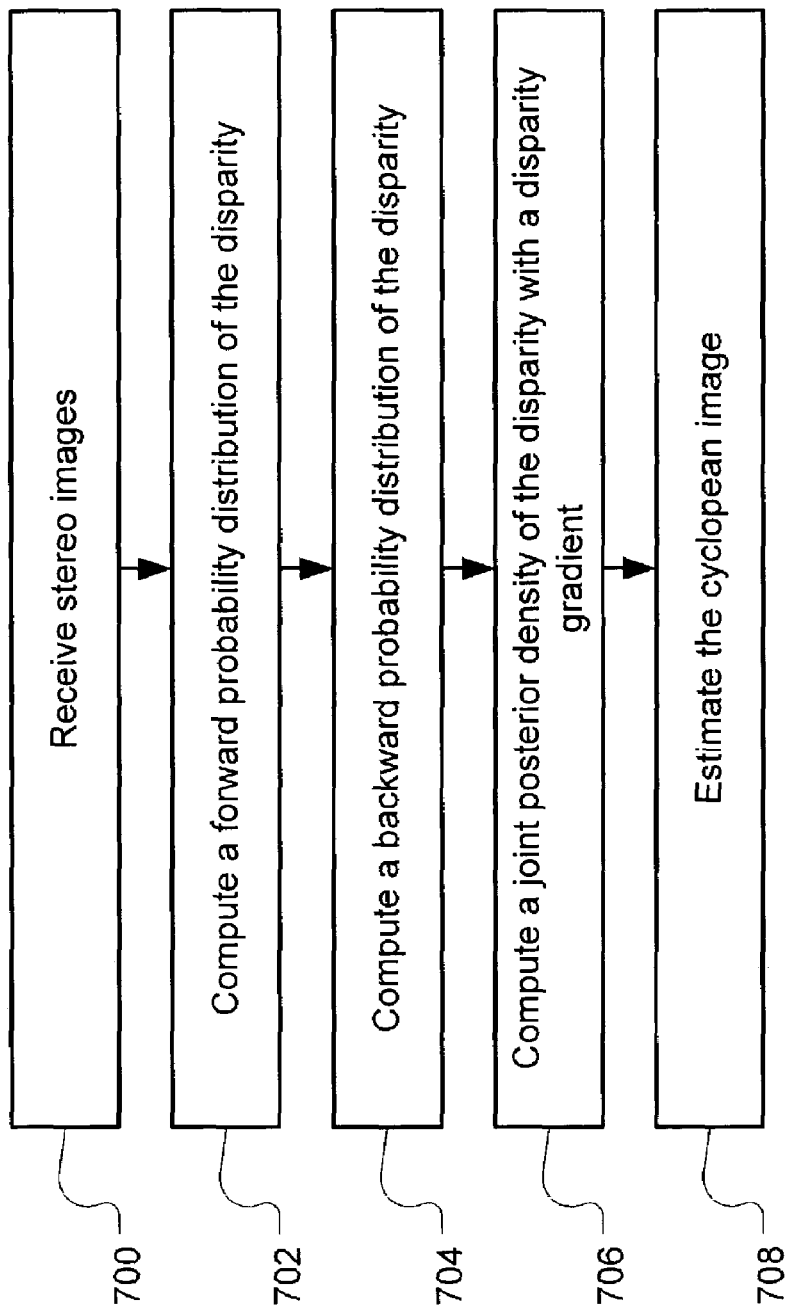
FIG. 7 illustrates operations of an exemplary process for determining a cyclopean image.

FIG. 7 illustrates operations of an exemplary process for determining a cyclopean image. A reception operation 700 receives two or more stereo images. Such images may be captured by a pair of stereo cameras, received from a storage device or communication network, or received through other means, including other types of imaging devices. A computation operation 702 computes a forward probability distribution of disparity between the pixels of the stereo images—see, for example, Equation (11). A computation operation 704 computes a backward probability distribution of disparity between the pixels of the stereo images—see, for example, Equation (12).

A computation operation 706 computes a joint density of the disparity with the disparity gradient using the forward and backward probability distributions of disparity—see, for example, Equation (15). An estimation operation 708 estimates the cyclopean image based on the joint density of the disparity with the disparity gradient and the expectation of the cyclopean intensities—see, for example, the intensity expectation shown in Equation (19). The image data determined by this process may be displayed in the video window of a display device to provide a gaze corrected image of a remote conference participant.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part 15 of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 8. The logical connections depicted in FIG. 8 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, computation modules or an estimation module may be incorporated as part of the operating system 35, application programs 36, or other program modules 37. The forward and backward probability distributions, intensity expectations, and the resulting cyclopean image Is data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of determining a cyclopean image associated with a left image and a right image, the method comprising:

computing a joint posterior density $\xi(d_k, \delta_k)$ of a stereo disparity $d_k$ in conjunction with a disparity gradient $\delta_k$, wherein the joint posterior density is based on a forward probability distribution of the stereo disparity and a backward probability distribution of the stereo disparity; and estimating the cyclopean image based on the joint posterior density of the stereo disparity with the disparity gradient.

2. The method of claim 1 wherein the disparity gradient represents a difference between stereo disparity values at adjacent cyclopean coordinates of the cyclopean image.

3. The method of claim 1 wherein the cyclopean image is associated with a
current cyclopean coordinate and further comprising:
computing the forward probability distribution of the stereo disparity based on a distribution of disparity gradients for the current cyclopean coordinate given a previous cyclopean coordinate.

4. The method of claim 1 wherein the cyclopean image is associated with a
current cyclopean coordinate and further comprising:
computing the forward probability distribution of the stereo disparity based on an observation given the current cyclopean coordinate and a previous cyclopean coordinate.

5. The method of claim 1 wherein the cyclopean image is associated with a
current cyclopean coordinate and further comprising:
computing the backward probability distribution of the stereo disparity based on a distribution of disparity gradients for a next cyclopean coordinate given the current cyclopean coordinate.

6. The method of claim 1 wherein the cyclopean image is associated with a
current cyclopean coordinate and further comprising:
computing the backward probability distribution of the stereo disparity based on an observation given the current cyclopean coordinate and a next cyclopean coordinate.

7. The method of claim 1 wherein the cyclopean image is associated with a
current cyclopean coordinate and estimating the cyclopean image comprises:
computing an intensity expectation at the current cyclopean coordinate over observation noise.

8. The method of claim 1 wherein the cyclopean image is associated with a
current cyclopean coordinate and estimating the cyclopean image comprises:
optimizing a loss function to estimate the cyclopean intensity at the current cyclopean coordinate.

9. The method of claim 1 wherein the cyclopean image is associated with a
current cyclopean coordinate and estimating the cyclopean image comprises:
computing an intensity expectation at the current cyclopean coordinate over observation noise; and
computing a posterior mean based on the intensity expectation and the joint posterior density of the stereo disparity with a disparity gradient.

10. A computer-readable storage medium
product encoding a computer program for executing on a computer system a computer
process for determining a cyclopean image associated with a left image and a right image, the computer process comprising:
computing a joint posterior density $\xi(d_k, \delta_k)$ of a stereo disparity $d_k$ in conjunction with a disparity gradient $\delta_k$,
wherein the joint posterior density is based on a forward probability distribution of the stereo disparity and a backward probability distribution of the stereo disparity; and estimating the cyclopean image based on the joint posterior density of the stereo disparity with the disparity gradient.

11. The computer-readable storage medium product of claim 10 wherein the disparity gradient represents a difference between stereo disparity values at adjacent cyclopean coordinates of the cyclopean image.

12. The computer-readable storage medium product of claim 10 wherein the cyclopean image is associated with a current cyclopean coordinate and the computer process further comprises:
computing the forward probability distribution of the stereo disparity based on a distribution of disparity gradients for the current cyclopean coordinate given a previous cyclopean coordinate.

13. The computer-readable storage medium product of claim 10 wherein the cyclopean image is associated with a current cyclopean coordinate and the computer process further comprises:
computing the forward probability distribution of the stereo disparity based on an observation given the current cyclopean coordinate and a previous cyclopean coordinate.

14. The computer-readable storage medium product of claim 10 wherein the cyclopean image is associated with a current cyclopean coordinate and the computer process further comprises:
computing the backward probability distribution of the stereo disparity based on a distribution of disparity gradients for a next cyclopean coordinate given the current cyclopean coordinate.

15. The computer-readable storage medium product of claim 10 wherein the cyclopean image is associated with a current cyclopean coordinate and the computer process further comprises:
computing the backward probability distribution of the stereo disparity based on an observation given the current cyclopean coordinate and a next cyclopean coordinate.

16. The computer-readable storage medium product of claim 10 wherein the cyclopean image is associated with a current cyclopean coordinate and estimating the cyclopean image comprises:
computing an intensity expectation at the current cyclopean coordinate over observation noise.

17. The computer-readable storage medium product of claim 10 wherein the cyclopean image is associated with a current cyclopean coordinate and estimating the cyclopean image comprises:
optimizing a loss function to estimate the cyclopean intensity at the current cyclopean coordinate.

18. The computer-readable storage medium product of claim 10 wherein the cyclopean image is associated with a current cyclopean coordinate and estimating the cyclopean image comprises:
computing an intensity expectation at the current cyclopean coordinate over observation noise; and
computing a posterior mean based on the intensity expectation and the joint posterior density of the stereo disparity with a disparity gradient.

19. A system for determining a cyclopean image associated with a left image and a right image, the system comprising:

a forward-backward module computing a joint posterior density $\xi(d_k, \delta_k)$ of a stereo disparity $d_k$ in conjunction with a disparity gradient $\delta_k$, wherein the joint posterior density is based on a forward probability distribution of the stereo disparity and a backward probability distribution of the stereo disparity; and a cyclopean image generator estimating the cyclopean image based on the joint posterior density of the stereo disparity with the disparity gradient.

20. The system of claim 19 wherein the disparity gradient represents a difference between stereo disparity values at adjacent cyclopean coordinates of the cyclopean image.

21. The system of claim 19 wherein the cyclopean image is associated with a current cyclopean coordinate and further comprising:

a forward probability module computing the forward probability distribution of the stereo disparity based on a distribution of disparity gradients for the current cyclopean coordinate given a previous cyclopean coordinate.

22. The system of claim 19 wherein the cyclopean image is associated with a current cyclopean coordinate and further comprising:

a forward probability module computing the forward probability distribution of the stereo disparity based on an observation given the current cyclopean coordinate and a previous cyclopean coordinate.

23. The system of claim 19 wherein the cyclopean image is associated with a current cyclopean coordinate and further comprising:

a backward probability module computing the backward probability distribution of the stereo disparity based on a distribution of disparity gradients for a next cyclopean coordinate given the current cyclopean coordinate.

24. The system of claim 19 wherein the cyclopean image is associated with a current cyclopean coordinate and further comprising:

a backward probability module computing the backward probability distribution of the stereo disparity based on an observation given the current cyclopean coordinate and a next cyclopean coordinate.

25. The system of claim 19 wherein the cyclopean image is associated with a current cyclopean coordinate and the cyclopean image generator computes an intensity expectation at the current cyclopean coordinate over observation noise.

26. The system of claim 19 wherein the cyclopean image is associated with a current cyclopean coordinate and the cyclopean image generator optimizes a loss function to estimate the cyclopean intensity at the current cyclopean coordinate.

27. The system of claim 19 wherein the cyclopean image is associated with a current cyclopean coordinate and the cyclopean image generator computes an intensity expectation at the current cyclopean coordinate over and a posterior mean based on the intensity expectation and the joint posterior density of the stereo disparity with a disparity gradient.

* * * * *